US008602873B2

(12) United States Patent
Barton et al.

(10) Patent No.: US 8,602,873 B2
(45) Date of Patent: Dec. 10, 2013

(54) METHOD AND APPARATUS FOR PROVIDING GAMING RESULTS INCLUDING DISPLAYED BONUS VALUE ENHANCEMENTS

(75) Inventors: Andrea R. Barton, Austin, TX (US); Daniel Eulenfeld, Round Rock, TX (US)

(73) Assignee: Multimedia Games, Inc., Austin, TX (US)

( * ) Notice: Subject to any disclaimer, the term of this patent is extended or adjusted under 35 U.S.C. 154(b) by 27 days.

(21) Appl. No.: 13/493,511

(22) Filed: Jun. 11, 2012

(65) Prior Publication Data

US 2012/0252552 A1 Oct. 4, 2012

Related U.S. Application Data

(63) Continuation of application No. 12/195,119, filed on Aug. 20, 2008, now Pat. No. 8,197,327.

(60) Provisional application No. 60/987,769, filed on Nov. 13, 2007.

(51) Int. Cl.
*G06F 9/24* (2006.01)

(52) U.S. Cl.
USPC ............................................... 463/20; 463/21

(58) Field of Classification Search
CPC .................................................... G07F 17/3267
USPC ...................................................... 463/20, 21
See application file for complete search history.

(56) References Cited

U.S. PATENT DOCUMENTS 5,752,881 A * 5/1998 Inoue .............................. 463/20
5,833,537 A 11/1998 Barrie
5,947,820 A 9/1999 Morro et al.
5,980,384 A * 11/1999 Barrie ............................. 463/16
5,997,401 A 12/1999 Crawford
6,059,658 A * 5/2000 Mangano et al. ............... 463/16
6,105,962 A 8/2000 Malavazos et al.
6,224,483 B1 5/2001 Mayeroff (Continued)

FOREIGN PATENT DOCUMENTS

WO WO 2006/029446 A1 3/2006

OTHER PUBLICATIONS

International Search Report for PCT/US2008/083199 dated Jan. 8, 2009 (2 pages).

(Continued)

*Primary Examiner* — Pierre E Elisca
(74) *Attorney, Agent, or Firm* — Nathan H. Calvert, Esq.; Russell D. Culbertson, Esq.; JP Cody, Esq.

(57) ABSTRACT

Gaming machines, methods, and programs are provided for displaying gaming results through a player interaction process that provides multiple prize progressions for a player and varies the prize progressions during the course of play. One preferred game includes conducting multiple instances of a first game to obtain a number of first game outcomes. These first game outcomes will include a number of prize enhancer activating outcomes. Each respective prize enhancer activating outcome prompts persistent display of a respective prize enhancer symbol. In some versions, one or more of the prize enhancer symbols are multiplier values. The symbols move in graphic sequence to a bonus round where they occupy spaces in a multiplier wheel, which is spun along with a prize wheel to determine a total prize.

2 Claims, 12 Drawing Sheets

(56) References Cited

U.S. PATENT DOCUMENTS

| | | | | |
|---|---|---|---|---|
| 6,270,412 | B1 | 8/2001 | Crawford et al. | |
| 6,569,015 | B1 * | 5/2003 | Baerlocher et al. | 463/16 |
| 6,705,944 | B2 * | 3/2004 | Luciano | 463/20 |
| 6,899,625 | B2 | 5/2005 | Luciano, Jr. et al. | |
| 7,029,395 | B1 * | 4/2006 | Baerlocher | 463/20 |
| 7,029,396 | B2 * | 4/2006 | Jaffe et al. | 463/20 |
| 7,306,520 | B2 | 12/2007 | Kaminkow et al. | |
| 2001/0022429 | A1 * | 9/2001 | Luciano et al. | 273/142 H |
| 2001/0034260 | A1 | 10/2001 | Luciano, Jr. et al. | |
| 2001/0054794 | A1 * | 12/2001 | Cole et al. | 273/138.1 |
| 2003/0027628 | A1 | 2/2003 | Luciano | |
| 2004/0053673 | A1 | 3/2004 | Mishra | |
| 2004/0224751 | A1 * | 11/2004 | Jaffe et al. | 463/20 |
| 2005/0026673 | A1 | 2/2005 | Paulsen et al. | |
| 2005/0037838 | A1 * | 2/2005 | Dunaevsky et al. | 463/25 |
| 2005/0070353 | A1 | 3/2005 | Webb et al. | |
| 2005/0215318 | A1 * | 9/2005 | Seelig et al. | 463/31 |
| 2006/0068892 | A1 * | 3/2006 | Gomez et al. | 463/20 |
| 2006/0073878 | A1 * | 4/2006 | Shackelford et al. | 463/20 |
| 2006/0135249 | A1 * | 6/2006 | Seelig et al. | 463/22 |
| 2006/0281530 | A1 * | 12/2006 | Seelig et al. | 463/20 |
| 2009/0005155 | A1 | 1/2009 | Rodgers et al. | |
| 2009/0111577 | A1 * | 4/2009 | Mead | 463/31 |
| 2009/0215523 | A1 * | 8/2009 | Acres | 463/20 |
| 2009/0227314 | A1 * | 9/2009 | Bennett | 463/16 |

OTHER PUBLICATIONS

Written Opinion of the International Searching Authority for PCT/US2008/083199 dated Jan. 8, 2009 (6 pages).

* cited by examiner

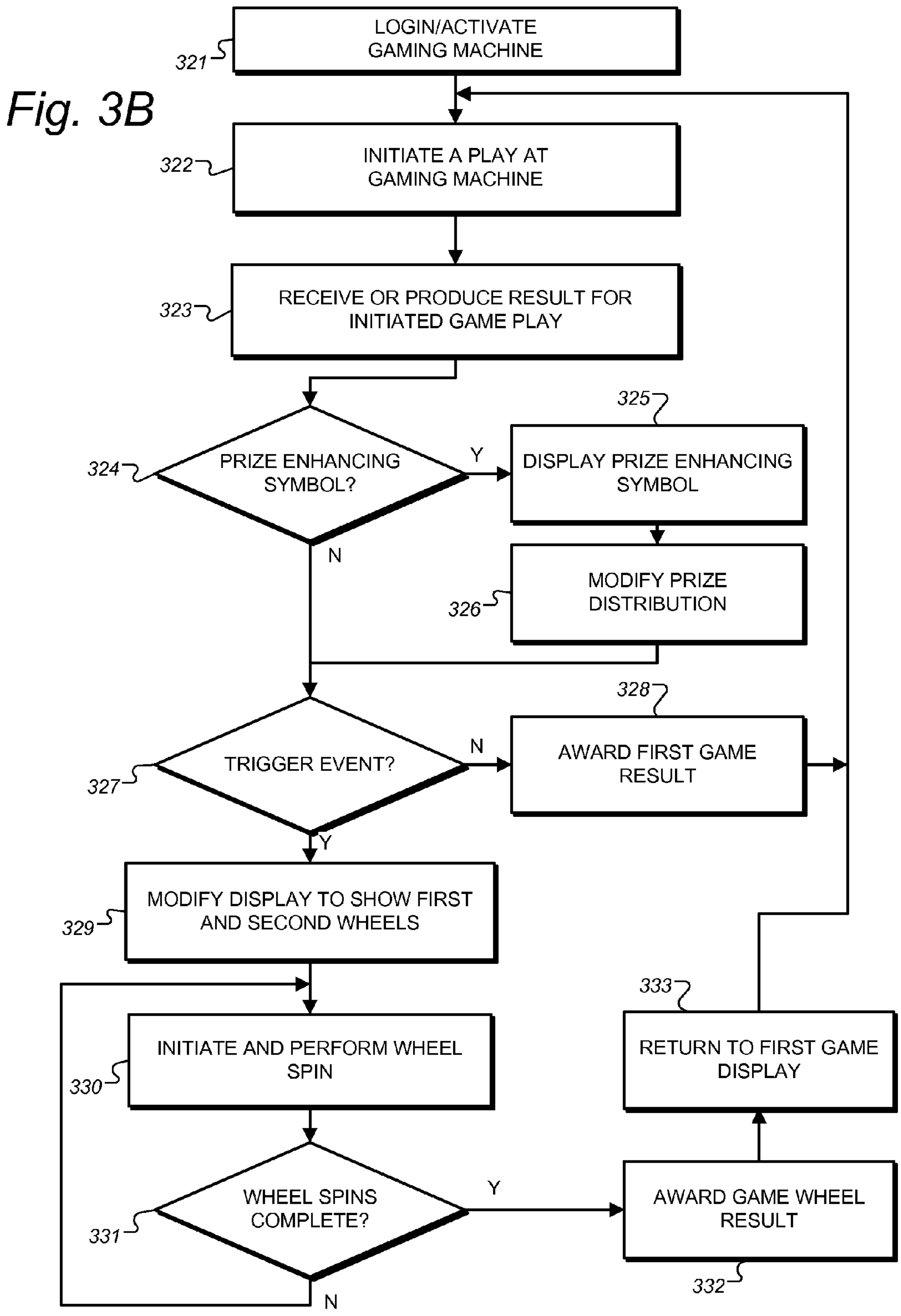
Fig. 3B
LOGIN/ACTIVATE GAMING MACHINE
321
INITIATE A PLAY AT GAMING MACHINE
322
RECEIVE OR PRODUCE RESULT FOR INITIATED GAME PLAY
323
PRIZE ENHANCING SYMBOL?
324
Y
N
DISPLAY PRIZE ENHANCING SYMBOL
325
MODIFY PRIZE DISTRIBUTION
326
TRIGGER EVENT?
327
N
Y
AWARD FIRST GAME RESULT
328
MODIFY DISPLAY TO SHOW FIRST AND SECOND WHEELS
329
INITIATE AND PERFORM WHEEL SPIN
330
WHEEL SPINS COMPLETE?
331
Y
N
AWARD GAME WHEEL RESULT
332
RETURN TO FIRST GAME DISPLAY
333

METHOD AND APPARATUS FOR PROVIDING GAMING RESULTS INCLUDING DISPLAYED BONUS VALUE ENHANCEMENTS

CROSS-REFERENCE TO RELATED APPLICATIONS

This application is a continuation of U.S. patent application Ser. No. 12/195,119, filed Aug. 20, 2008, and entitled "Method, Apparatus, and Program Product for Displaying Gaming Results Through A Variable Prize Wheel" and issued as U.S. Pat. No. 8,197,327, which claimed the benefit, under 35 U.S.C. §119(e), of U.S. Provisional Patent Application Ser. No. 60/987,769 filed Nov. 13, 2007, and also entitled "Method, Apparatus, and Program Product for Displaying Gaming Results Through A Variable Prize Wheel." The Applicants hereby claim the benefit of the above-identified nonprovisional application under 35 U.S.C. §120, and claim the benefit of the above-identified provisional application under 35 U.S.C. §119(e). The entire content of each of these prior applications is incorporated herein by this reference.

COPYRIGHT NOTICE

A portion of the disclosure of this patent document contains material which is subject to copyright protection. The copyright owner has no objection to the facsimile reproduction by any one of the patent documents or the patent disclosure, as it appears in the Patent and Trademark Office patent file or records, but otherwise reserves all rights of copyright.

TECHNICAL FIELD OF THE INVENTION

This invention relates to gaming systems and to gaming machines used to present gaming results. More particularly, the invention relates to methods for displaying gaming results including displayed bonus value enhancements.

BACKGROUND OF THE INVENTION

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. Video-based gaming machines may also be used to show card games or various types of competitions such as simulated horse races in which wagers may be placed. Game manufacturers are continuously pressed to develop new game presentations, formats, and game graphics in an attempt to provide high entertainment value for players and thereby attract and keep players.

SUMMARY OF THE INVENTION

The present invention includes a highly entertaining method of presenting game results. The entertainment value is partially achieved by carrying features from a first game presentation over to a second game presentation and employing those features to modify a prize wheel. The present invention encompasses methods for operating a gaming machine as well as both apparatus and program products for implementing the gaming machine operation methods.

A method embodying principles of the invention may be implemented in a gaming machine using one or more display devices such as CRTs, LCDs, plasma displays, or other types of video display devices. The video display device or devices are used to show the first game graphic elements and prize wheel graphic elements according to the invention. As used in this disclosure and the accompanying claims, a gaming machine through which the present invention may be implemented will be referred to generally as a gaming machine regardless of the nature of the display device arrangement used to show results to the player.

One preferred method according to the invention includes conducting multiple instances of a first game to obtain a number of first game outcomes. These first game outcomes will include a number of prize enhancer activating outcomes. Each respective prize enhancer activating outcome prompts the display of a respective prize enhancer symbol. In response to a trigger event, this preferred method includes displaying a first wheel having a first diameter, a first rotational axis, and a number of symbol locations spaced apart at different angular orientations about the first rotational axis. The first wheel is displayed with the first rotational axis extending substantially perpendicular to a display plane such as a plane defined by a video display used to generate the wheel graphic. Also in response to the trigger event, this preferred method includes displaying a second wheel having a second diameter, a second rotational axis, and a number of symbol locations spaced apart at different angular orientations about the second rotational axis. The diameter of the second wheel is less than the first diameter, and the second wheel is displayed within the area defined by the first wheel with the second rotational axis extending parallel to and offset from the first rotational axis. Further in response to the trigger event, the method includes moving each respective displayed prize enhancer symbol to a different one of the symbol locations of the first wheel or the second wheel. In response to an activation by a player the method further includes causing the first wheel to rotate about the first rotational axis and causing the second wheel to rotate about the second rotational axis for a period of time and ultimately each stop at a particular angular orientation with a respective prize enhancer symbol aligned in an award relationship with a prize symbol on the other one of the first wheel or second wheel. This preferred method also includes awarding a prize to the player. The prize corresponds to a combined effect of the prize symbol and the respective prize enhancer symbol aligned in the award relationship.

In some forms of the invention one or more of the prize enhancer symbols are multiplier values. Each respective displayed prize enhancer symbol may be moved to a different one of the symbol locations of the first wheel. The prize symbol may be one of a number of numerical prize values spaced apart on the second wheel at different angular orientations about the second rotational axis.

In one preferred form of the invention each first game outcome is displayed through a matrix of symbol locations and each respective prize enhancer symbol is displayed in a peripheral area around the matrix of symbol locations.

During part of the wheel rotation, the method may include producing an obscuring graphic. This obscuring graphic obscures the second wheel for a small part of the time that it rotates about the second rotational axis, less than the entire rotation time. This obscuring graphic may be used to allow the angular orientation of the smaller wheel to be skipped abruptly to produce a desired alignment between the first and second wheels for showing a prize.

A gaming apparatus in one form of the invention includes a display device arrangement and a player input device arrangement. The apparatus further includes a first game controller for (i) responding to a number of first game activations entered from the player input device arrangement to obtain a number of first game outcomes, the number of first game outcomes including a number of prize enhancer activating outcomes, and for (ii) causing a respective prize enhancer symbol to be displayed at the display device in response to each prize enhancer activating outcome. A game display controller may be included in the apparatus for responding to a trigger event to (i) cause a first wheel to be displayed at the display device arrangement, the first wheel having a first diameter, a first rotational axis, and a number of symbol locations spaced apart at different angular orientations about the first rotational axis, the first wheel being displayed with the first rotational axis extending substantially perpendicular to a display plane, to (ii) cause a second wheel to be displayed at the display device arrangement, the second wheel having a second diameter, a second rotational axis, and a number of symbol locations spaced apart at different angular orientations about the second rotational axis, the second diameter being less than the first diameter and the second wheel being displayed within the area defined by the first wheel with the second rotational axis extending parallel to and offset from the first rotational axis, and to (iii) cause each respective displayed prize enhancer symbol to be moved to a different one of the symbol locations of the first wheel or the second wheel. A second game controller may respond to an activation by a player through the player input arrangement, to cause the first wheel to rotate about the first rotational axis and cause the second wheel to rotate about the second rotational axis for a period of time and ultimately each stop at a particular angular orientation with a respective prize enhancer symbol aligned in an award relationship with a prize symbol on the other one of the first wheel or second wheel. An award controller is included in the apparatus for awarding a prize to the player. The prize corresponds to a combined effect of the prize symbol and the respective prize enhancer aligned in the award relationship, for example a multiplier value applied to a prize value.

A program product according to one form of the invention includes first game program code, game display program code, second game program code, and award program code. The first game program code is executable for (i) responding to a number of first game activations entered from the player input device arrangement to obtain a number of first game outcomes, the number of first game outcomes including a number of prize enhancer activating outcomes, and for (ii) causing a respective prize enhancer symbol to be displayed at the display device in response to each prize enhancer activating outcome. The game display program code is executable for responding to a trigger event to (i) cause a first wheel to be displayed at the display device arrangement, the first wheel having a first diameter, a first rotational axis, and a number of symbol locations spaced apart at different angular orientations about the first rotational axis, the first wheel being displayed with the first rotational axis extending substantially perpendicular to a display plane, to (ii) cause a second wheel to be displayed at the display device arrangement, the second wheel having a second diameter, a second rotational axis, and a number of symbol locations spaced apart at different angular orientations about the second rotational axis, the second diameter being less than the first diameter and the second wheel being displayed within the area defined by the first wheel with the second rotational axis extending parallel to and offset from the first rotational axis, and to (iii) cause each respective displayed prize enhancer symbol to be moved to a different one of the symbol locations of the first wheel or the second wheel. The second game program code is executable for, in response to an activation by a player through the player input arrangement, causing the first wheel to rotate about the first rotational axis and causing the second wheel to rotate about the second rotational axis for a period of time and ultimately each stop at a particular angular orientation with a respective prize enhancer aligned in an award relationship with a prize symbol on the other one of the first wheel or second wheel. The award program code is executable for awarding a prize to the player, the prize corresponding to a combined effect of the prize symbol and the respective prize enhancer aligned in the award relationship.

These and other advantages and features of the invention will be apparent from the following description of the preferred embodiments, considered along with the accompanying drawings.

BRIEF DESCRIPTION OF THE DRAWINGS

FIG. 3B is a flow chart showing overall operation of a game of another embodiment.

DESCRIPTION OF PREFERRED EMBODIMENTS

Figure 1:
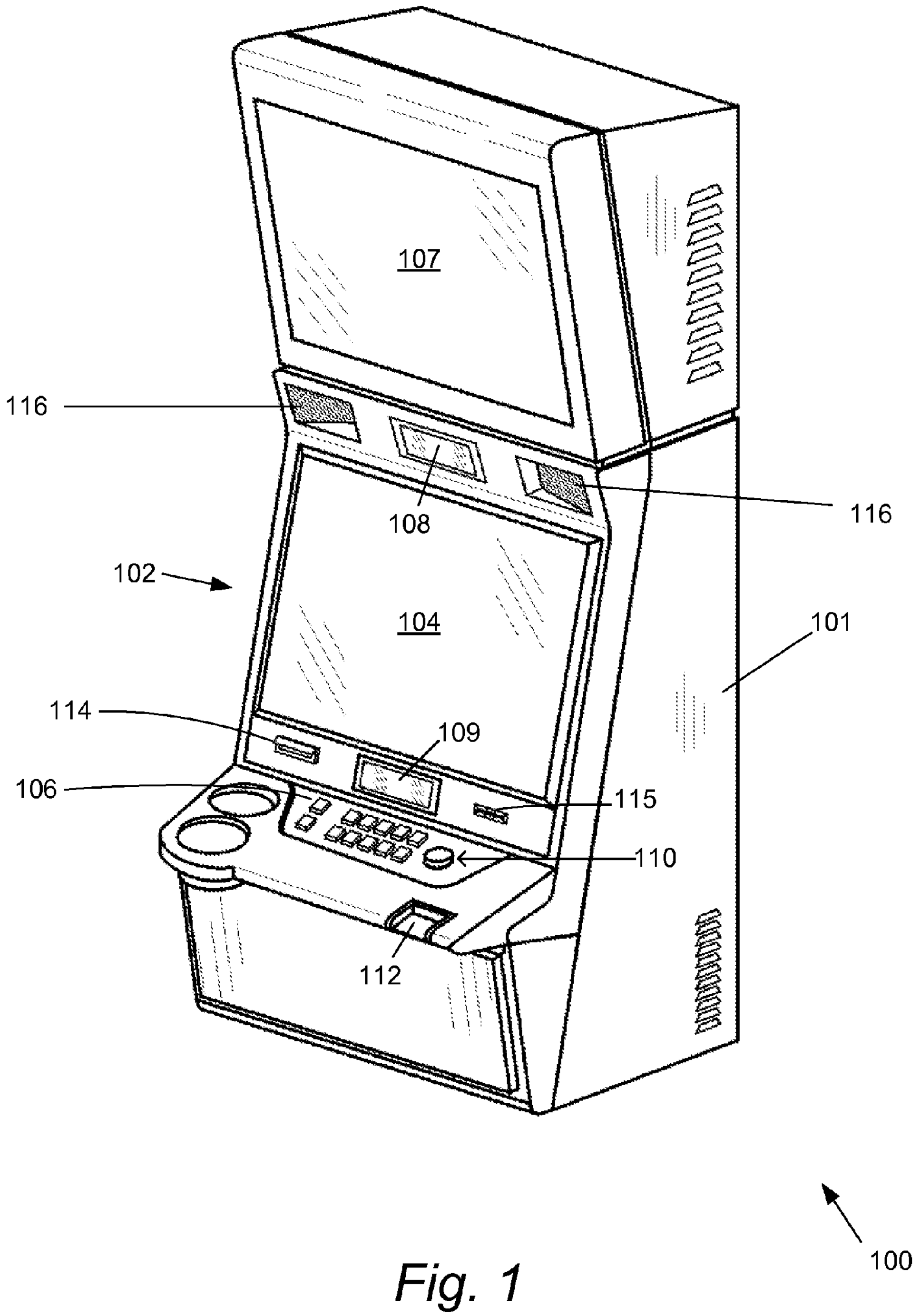
FIG. 1 is a view in front perspective of a gaming machine which may be used in a gaming system embodying the principles of the present invention.
Figure 2:
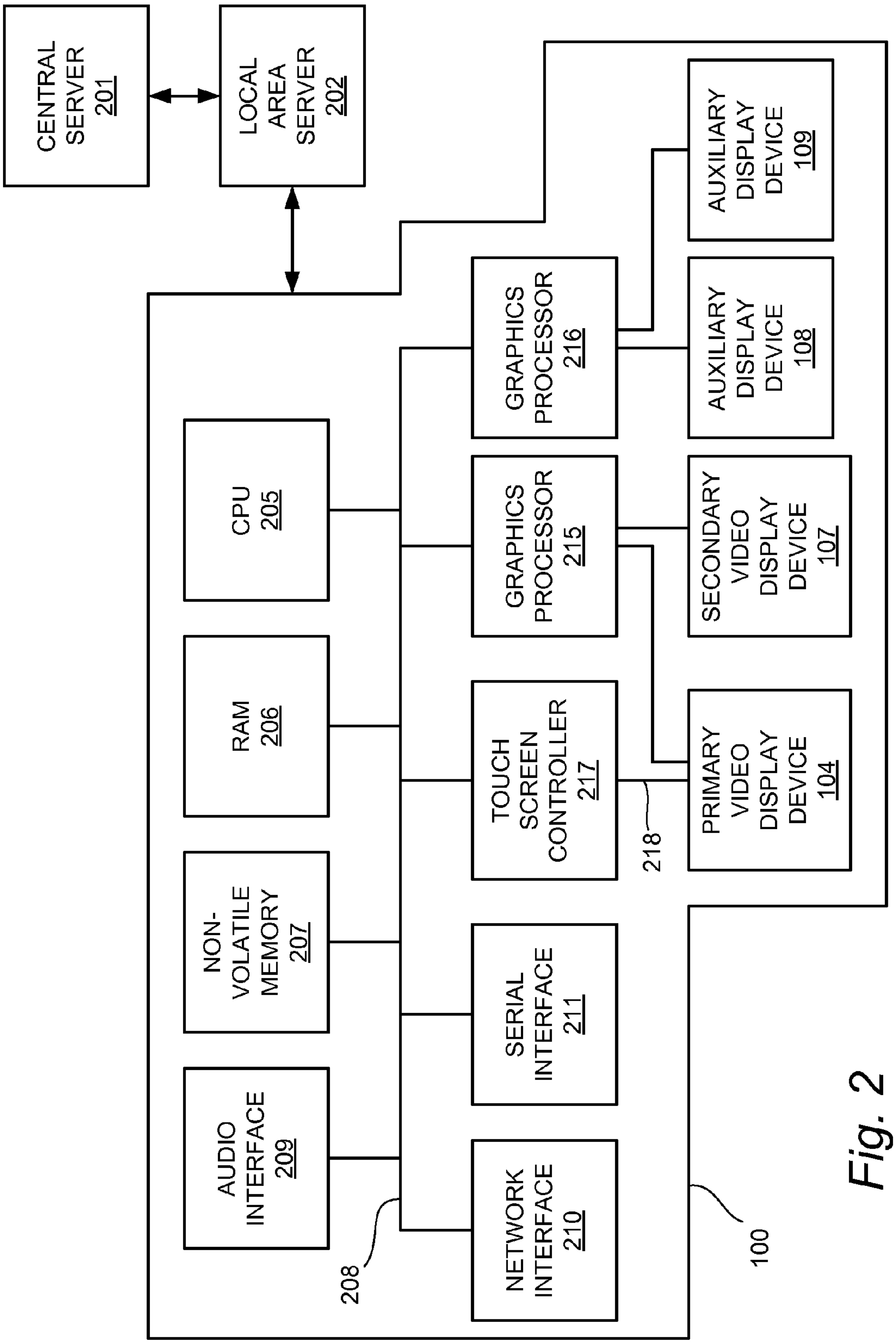
FIG. 2 is a diagrammatic representation showing various electronic components of the gaming machine shown in FIG. 1 together with additional gaming system components.

FIG. 1 shows a gaming machine 100 that may be used to implement a variable prize enhancement game according to the present invention. The block diagram of FIG. 2 shows further details of gaming machine 100 connected in a gaming system in which the present invention may be used to present gaming results to players.

Referring to FIG. 1, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

Gaming machine 100 illustrated in FIG. 1, also includes a number of mechanical control buttons 110 mounted on ledge 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 2 provides a block diagram showing various electronic components of gaming machine 100 together with gaming system components external to the gaming machine. In particular, FIG. 2 shows gaming machine 100 connected for communication with local area server 202 and central server 201. Local area server 202 and central server 201, or both servers, may cooperate to identify results that are provided to gaming machine 100 in response to a game play entered (initiated) at the gaming machine. That is, local area server 202 and/or central server 201, or more particularly, one or more processing devices associated with local area server 202 and/or central server 201 may serve as a result controller for identifying game results achieved for a particular play in a game. Even where gaming machine 100 implements a result controller to identify a result for a game play initiated at the gaming machine, local area server 202 and/or central server 201 may be used to provide player tracking and accounting services for gaming machine 100 and other gaming machines included in the gaming system. It should be understood, however, that some forms of gaming machines that implement variable prize enhancement games according to the present invention may be entirely stand-alone gaming machines that do not communicate with any other devices.

FIG. 2 shows that gaming machine 100 includes a central processing unit (CPU) 205 along with random access memory 206 and nonvolatile memory or storage device 207. All of these devices are connected on a system bus 208 with an audio interface device 209, a network interface 210, and a serial interface 211. A graphics processor 215 is also connected on bus 208 and is connected to drive the primary video display device 104 and secondary video display device 107 (both mounted on cabinet 101 as shown in FIG. 1). A second graphics processor 216 is also connected on bus 208 in this example to drive the auxiliary display devices 108 and 109 also shown in FIG. 1. As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements are preferably mounted on a standard personal computer chassis and housed in a standard personal computer housing which is itself mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 2 as being connected directly on system bus 208 may in fact communicate with the other system components through a suitable expansion bus. Audio interface 209, for example, may be connected to the system via a PCI bus. System bus 208 is shown in FIG. 2 merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display devices included with the gaming machine 100. Also, a gaming machine implementing the present invention is not limited to any particular number of video display devices or other types of display devices, provided some display arrangement is included for displaying the prize enhancement graphic, the player selectable objects, and the display modifications resulting from the selection of the various player selectable objects.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement one or more controllers for performing functions associated with a variable prize wheel game according to the present invention. CPU 205 also executes software related to communications handled through network interface 210, and software related to various peripheral devices such as those connected to the system through audio interface 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network interface 210 provides an interface to other components of a gaming system such as the servers 202 and 201 in the illustrated embodiment.

It should be noted that the invention is not limited to gaming machines employing the personal computer-type arrangement of processing devices and interfaces shown in example gaming machine 100. Other gaming machines through which a variable prize wheel game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. Some preferred forms of the invention utilize one or more video display devices for displaying a first game graphic display, the transition sequence from the first game graphic display to a second game graphic display, and then show the wheel game graphic display. For example, a gaming machine such as that shown in FIG. 1 may use primary video display device 104 to display a primary/first game and then transition to a display suitable for showing a variable prize wheel and wheel spin game. As another example, a gaming machine suitable for providing a variable prize enhancement game may include a mechanical reel-type display rather than a video-type display device for displaying results in a primary game, and include a video display device for presenting the variable wheel game as a bonus game. Thus, a gaming machine suitable for use in the present invention may have a structure similar to that shown for gaming machine 100 in FIG. 1, but with a mechanical reel-type display replacing the primary video display device 104, and with the video display device 107 being used for displaying the prize wheel game.

Figure 3A:
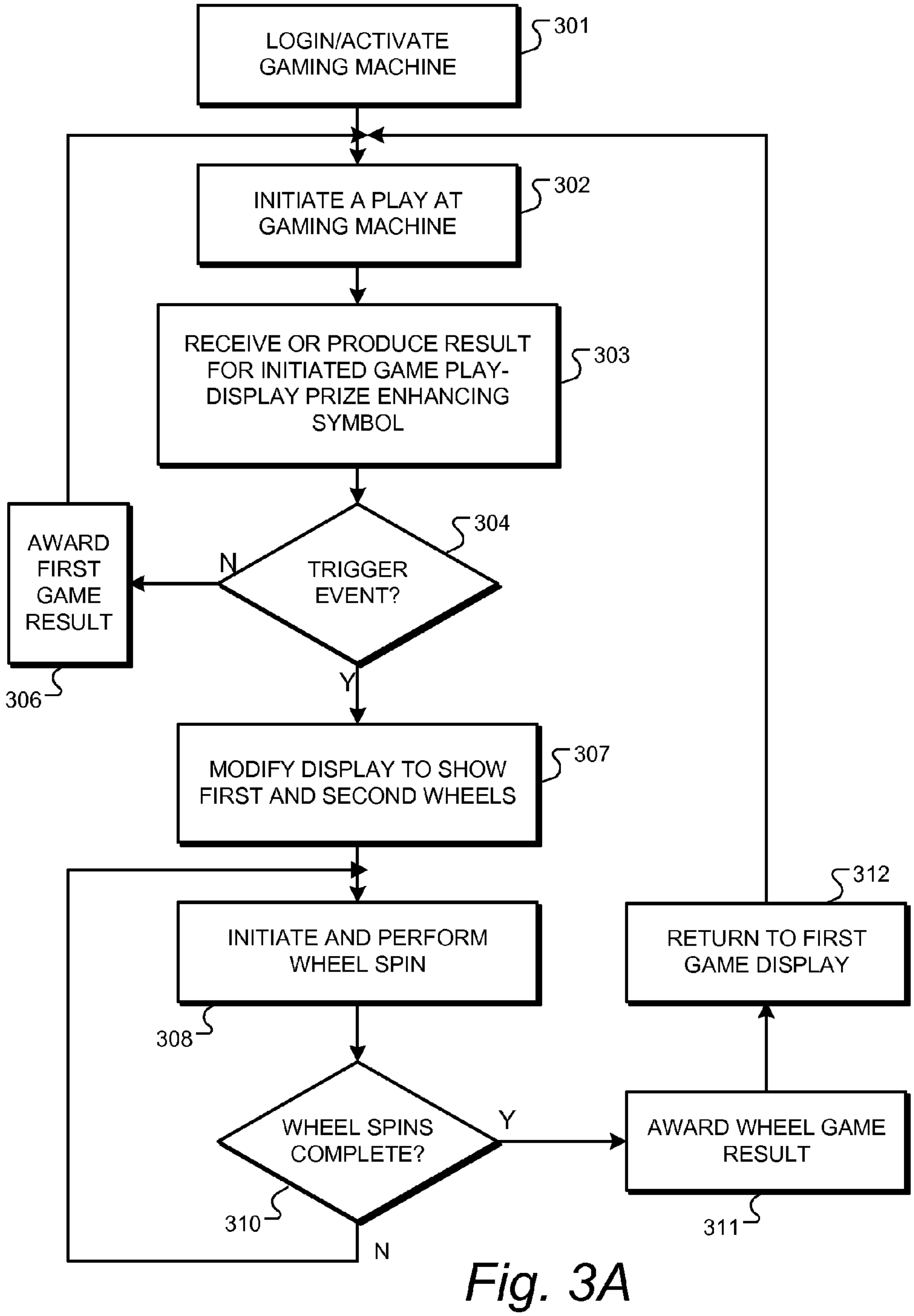
FIG. 3A is a flow chart showing the overall operation of a game that has a variable prize wheel presentation according to one embodiment of the invention.

FIG. 3A is a flow chart showing the overall operation of a game that has a variable prize wheel presentation according to one embodiment of the invention. After the player has logged on or otherwise activated the gaming machine (100 in FIGS. 1 and 2) as indicated at process block 301, the player may initiate a play in a first game at the gaming machine as indicated at process block 302. In response to the game play initiated at process block 302, the gaming machine ultimately receives or produces a result for the game play as indicated at process block 303. The result may be a winning outcome, a losing outcome, or an outcome comprising a prize enhancer activating outcome. If the outcome comprises a prize enhancer activating outcome, the method at process block 303 further includes displaying a respective prize enhancer symbol for the prize enhancer activating outcome. If no trigger event is detected at decision box 304, the process proceeds to process block 306 to award any first game prize associated with the result received or produced at process block 303.

If a trigger event is detected as indicated by an affirmative outcome at decision box 304, the process proceeds to modify the graphic display as indicated at process block 307. Specifically, the graphic display is modified to show first and second wheels as will be described further below in connection with the example graphic displays. Once the wheel graphic is displayed, the player is enabled to activate the wheels to perform a simulated wheel spin as indicated at process block 308. The player may be allowed to activate more than one wheel spin. After each spin, if it is determined that further wheel spins are available as indicated by a negative outcome at decision box 310, the process loops back to allow the player to initiate another spin. However, if the player's wheel spins are complete as indicated by a positive outcome at decision box 310, the process proceeds to award any wheel game result as indicated at process block 311 and then proceeds to return the state of the game to the first game display as indicated at process block 312. The process then returns to a point at which the player may initiate another play in the first game according to process block 302.

It should be noted that in one preferred form of the invention the wheel spins performed at process block 308 do not identify a result from each respective spin. Rather, an overall result to be achieved by the player in the wheel spin game has been determined, preferably by the result identified at block 303 for the immediately preceding play in the first game. Regardless of when in the process the result has been determined, the spins performed at process block 308 are controlled so as to show the player that previously determined result. In one preferred form of the invention, the gaming machine or some other component in the gaming system stores data correlating a number of results from the first game with a prize to be awarded for the wheel spin game. The data may also include a number of wheel spin results that total up to the desired overall prize. These wheel spins represent a script to be followed in the wheel spin game in order to ultimately produce the desired result for the player. Numerous different scripts may be stored with multiple groups of scripts from which the second game controller may select to produce the desired result for the player. The second game controller may select the script at random and may also randomize the steps within that script in order to ensure a realistic simulation of a wheel type game. Such display control scripts are further described below.

FIG. 3B is a flow chart of a game operation method according to another version of the invention. In this version, a different prize distribution, or "pay table," is provided depending on how many jewels a player has collected over the course of a playing session. The depicted method begins similarly to that in FIG. 3A. After the player has logged on or otherwise activated the gaming machine (100 in FIGS. 1 and 2) as indicated at process block 321, the player may initiate a play in a first game at the gaming machine as indicated at process block 322. In response to the game play initiated at process block 322, the gaming machine receives or produces a result for the game play as indicated at process block 323. The result may be a winning outcome, a losing outcome, or an outcome comprising a prize enhancer activating outcome. If a prize enhancer activating outcome results, at decision block 324 the method proceeds to process block 325 and displays a respective prize enhancer symbol for the prize enhancer activating outcome. After process block 325, the method modifies the prize distribution to a new prize distribution as indicated at process block 326. The new distribution accounts for higher possible prizes provided by higher "jewel" prize multipliers in the prize enhancer activating outcome. The longer the player plays, the more jewel multipliers they can collect and further enhance the prize distribution. A new prize enhancement level is also provided, consisting of higher potential multiplier values to be employed in the bonus round. Other prize enhancement level changes may provide other visual symbols that enhance the variety, and potentially the value, of prizes that may be awarded to the player in the base game or bonus round. Preferably, the prize enhancement level change persists during the game play session. The change in prize enhancement level preferably accompanies a change in prize distribution, but may also be separate in some embodiments.

As in the previous versions, a winning outcome may also include a trigger event. If no trigger event is detected at decision box 327, the process proceeds to process block 328 to award any first game prize associated with the result received or produced at process block 323.

If a trigger event is detected as indicated by an affirmative outcome at decision box 327, the process proceeds to modify the graphic display as indicated at process block 329. Specifically, the graphic display is modified to show first and second wheels as will be described further below in connection with the example graphic displays. Once the wheel graphic is displayed, the player is enabled to activate the wheels to perform a simulated wheel spin as indicated at process block 330. The player may be allowed to activate more than one wheel spin. After each spin, if it is determined that further wheel spins are available as indicated by a negative outcome at decision box 331, the process loops back to allow the player to initiate another spin. However, if the player's wheel spins are complete as indicated by a positive outcome at decision box 331, the process proceeds to award any wheel game result as indicated at process block 332 and then proceeds to return the state of the game to the first game display as indicated at process block 333. The process then returns to a point at which the player may initiate another play in the first game according to process block 322.

Figure 3C:
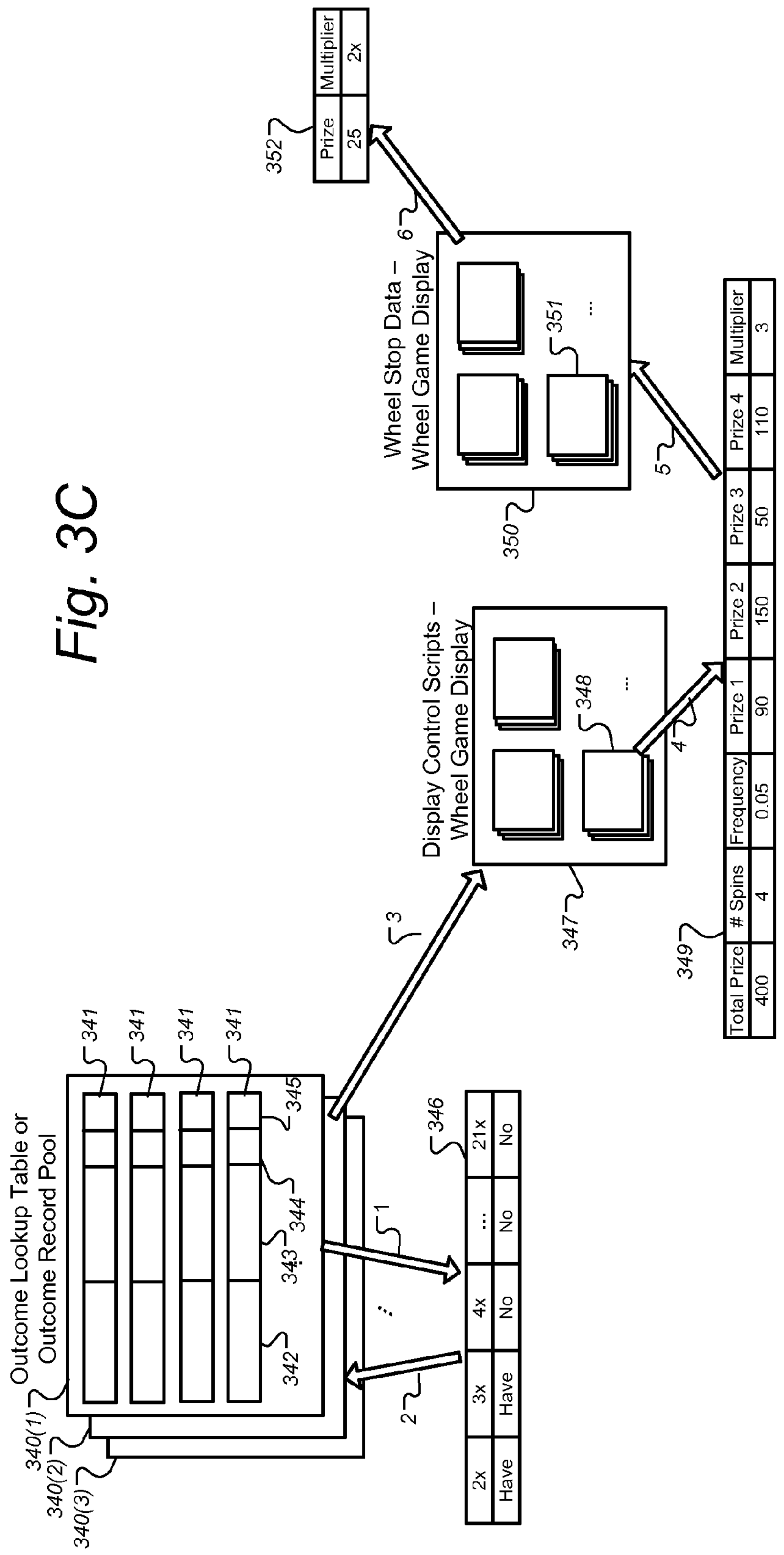
FIG. 3C is a diagram of various data structures employed in some embodiments.

FIG. 3C is a diagram of various data structures employed in some embodiments. The arrows help explain how the game logic uses the various data structures. The depicted data structures may be used, for example, in game versions with stand-alone type machines (using a random number generator running on the gaming machine) or machines that request outcomes from a server, or use predetermined pools of outcomes, or outcomes from server-based group bingo games. In a stand-alone version, a generated random number is used to index a table to lookup an outcome. The outcomes are stored in lookup tables 340 which are indexed by random number to provide suitable distributed, randomly-selected results. Each lookup table has a number of entries, each with an index 342, a prize amount 343 in credits, a prize enhancer activating field 344, and a bonus or secondary game trigger event field 345. The outcome entry may have other data fields to control other parts of the game. The secondary game trigger 345 indicates that the record outcome is a trigger event that activates the second display mode discussed above. Multiple lookup tables are used in some embodiments to implement the multiple prize distributions that the game may provide as a player collects more prize enhancers over the course of a game play session. A preferred stand-alone game includes at least 21 different tables, one for each number of jewel multipliers that may be collected (zero through twenty). Only three tables are shown in the drawing for simplicity, 340(1)-(3). The manner in which the tables are switched will be further described below.

As one alternative to a stand-alone game that uses a random number generator, some games may have an outcome record pool of predetermined outcomes in place of (instead of) lookup tables 340. The outcome record pools function similarly to lookup tables, but have a unique entry for every game outcome. The data contents of the entries are preferably similar to the lookup table embodiments, differing only in the index 342, which typically needs to have greater range for use in outcome record pools. In a predetermined outcome version, an outcome record 341 is chosen from a record pool 340 in response to a game play. Further, outcome record pools may or may not be accessed or indexed using a random number. Still other embodiments may use a server-hosted bingo game with multiple game play requests participating as bingo cards, the bingo patterns determining prize outcomes.

Referring to versions using outcome record pools 340, the record pools may be stored at a game server and accessed with game play requests from the gaming machine, or the server may transmit groups of outcome records to be stored and used locally at a gaming machine. In either case, the depicted sequence is used to provide an outcome record 341 in response to a player game play request, such as pushing the gaming machine spin button to make a wager. An outcome record 341 is chosen from the pool either randomly or from a randomly-organized queue. When chosen randomly, a random number is preferably used as an index to access the pool and select a record. When chosen from a randomly organized queue, the records are preferably chosen in their sequential order in the record pool.

Each record 341 has a record identifier 342 (rather than an index 342 as used in the first embodiment of FIG. 3C), a prize amount 343 in credits, a prize enhancer activating field 344, and a bonus or secondary game trigger event field 345. The outcome record data object may have other data fields to control other parts of the game. The secondary game trigger event field 345 indicates that the record outcome is a trigger event that activates the second wheel game display mode described herein. A preferred embodiment displays an outcome in the first display state to indicate a trigger event (FIG. 5, for example), and then a graphic sequence such as that described with regard to FIGS. 6-8. The first display state outcome may include no prize, or may include a separate base-game prize.

A preferred implementation uses multiple outcome record pools (or multiple prize distribution tables) 340. If a game outcome includes a prize enhancing outcome in field 344, the player collects an additional prize enhancing symbol. The preferred form uses prize multiplier symbols shown as jewels such as those in FIGS. 4-8. The prize enhancing symbols are collected over the course of a player's game play session, and are deleted when the session is over. In one implementation, this is accomplished by the first game controller checking the outcome record 341 for a prize enhancing outcome in field 344. If such outcome exists, the controller will modify a game enhancement state data object 346 to indicate that the game enhancement level has changed. This data object may be a single integer variable rather than an array as depicted. The controller then changes the outcome record table (or the lookup table in lookup table embodiments) to provide a different prize distribution for the game. This is indicated in the figure at the arrow marked "2", indicating that the game is being switched from prize distribution (either a lookup table or outcome pool) 340(1) to a different prize distribution 340 (2).

For example, suppose the player has collected one jewel multiplier during game play, and an outcome record 341 is provided with another jewel multiplier indicated in field 344. The controller would modify the data object 346 to record the fact the player has now collected two jewels by setting a flag, or a new "game level", as indicated by the "have" data in both the 2× game enhancement field and the 3× game enhancement field in data object 346. This may also be done by adjusting a single variable to increment the game enhancement state. The controller selects a prize distribution that goes with the new enhancement state, and that prize distribution is used for the subsequent game plays until it changes again. As previously described, the prize distribution may be implemented with outcome record pools, or lookup tables based on outcomes resulting from some random process. In the preferred game, prize enhancement outcomes are provided in numerical order, and thus the longer the player plays, the higher the prize enhancement level becomes as more jewel multipliers are collected. That is, a player starts at the base "no enhancement" (or 1×) level with no multiplier jewels collected, and then as jewels are collected first enters the "2× enhancement" by collecting a first jewel, and later enters the "3× enhancement" by collecting a second jewel, etc. The data object 346 is shown with two jewels collected. Other embodiments may provide that specific outcomes directly change the enhancement state without first progressing through lower levels.

The various prize enhancement levels provided by the various prize distributions preferably increase the percentage payout of the prize distribution the longer a player plays. The highest payout percentages may in fact have a payout percentage higher than 100%. This is enabled by the lower percentages that, on average, earn adequate revenue before the player reaches the highest levels.

A change in prize distribution changes the frequency and size of payouts for both the base game and the bonus or second wheel game. Various other bonus features or base game features may also be provided by the outcome records 341. Other features may have other data fields in records 341 to activate the features, or may be implemented by selecting display scripts or reel stop records that contain the features. The bonus or wheel game depicted herein is activated by a trigger event in field 345.

After displaying the base game result and graphic sequence to indicate a trigger event, the game proceeds to the sequence marked by arrows "3," "4," and "5" in FIG. 3C, which describe operation in the second display state. In this example game, the second display state operation includes free bonus spins. Other embodiments may include wagers instead of free spins. To start the free spins in the second display state, the display controller uses the prize amount field 343 to select a display control script from a group of scripts 347. This step is indicated by the arrow labeled "3."

The selection process at arrow 3 may be made in any suitable manner that selects a display control script to display the free-spin bonus outcome based on the outcome record. The selected script is used to control the display to provide an exciting series of events in the free-spin bonus round. A preferred control sequence proceeds as follows. The gaming machine presentation controller uses the prize amount 343 to select a set 348 of display control scripts from the group 347. The group 347 has multiple sets. In some embodiments, a different group 347 is provided for each enhancement level that a player may reach. Alternatively, such categorization may be achieved by including a multiplier field in the script to indicate which enhancement level the script is designed to display. The selected set 348 includes, in this example version, all display control scripts that have a total prize outcome equal to the prize amount at the current enhancement level (3×). The set 348 preferably includes many display control scripts that each employ a different sequence of events to indicate the total prize amount. This helps provide variety and excitement to the game. For example, suppose the selected game outcome entry or record 341 is a free-spin bonus result having a prize amount 343 indicating a 400 credit prize. The display controller looks to the group of display control scripts 347 and selects the set of scripts 348 that all have a total prize value of 400 credits. The display controller then randomly selects a script from this set, preferably by generating a random number and using it as an index to identify a particular script. Any suitable random selection or randomization step may be used, or a predetermined sequence may also be used if it is long enough that no pattern is discernable during player use of the gaming machine. In any event, a single display control script 349 is chosen from the set 348 for use in displaying the free spin bonus round results to the player. This is indicated by the arrow marked "4."

In this implementation, a display control script 349 chosen by arrow 4 for the free spin bonus round includes the depicted data fields. Other fields may also be included, and some fields are not absolutely necessary; for example the Total Prize field may be indicated merely by presence in a set 348 all having a particular total prize. This version includes the total prize field in the display control script for tracking purposes. The script 349 contains a "# Spins" field to indicate the number of free spins in this bonus round. Preferred versions have three spins if wagering below "max bet" level, and four free spins if playing at the "max bet" level. The free spin bonus is only available, in the preferred embodiment, when a player is betting on max lines. The Frequency field indicates a number indicating the hit frequency or probability that this particular script will be selected from the set 348. The depicted example shows a 0.05 Frequency value, indicating that this script will be shown 5% of the time that a total prize of 400 credits is awarded in a free spin bonus round. This hit frequency is preferably controlled through selection by an evenly-distributed random number, but may be enforced by other suitable methods, including random number based methods or methods that rigidly enforce the hit frequency. The script may include a Multiplier field to indicate which enhancement level is used with the script. Note that this Multiplier does not determine the multiplier outcome of the wheel spins, but merely the mode in which the spin is conducted, which also provides the maximum multiplier in that mode. Finally, the script 349 includes a group of spin result indicators that tell how to divide the total prize between all the spins in the bonus round. The depicted spin result indicators Prize 1-Prize 4 show the results awarded for each free spin in the bonus round. These may have a zero value individually but must add up to the total prize value.

The presentation controller employs the script 349 in controlling display of a sequence of free spins. Such control is accomplished, in this version, by selecting a set 351 of wheel stop data objects from a group 350 of wheel stop data objects. This selection step is indicated at arrows 5 and 6. The depicted wheel stop data object group 350 holds sets of data indicating the wheel positions at which the simulated wheel will stop after simulating spinning. The group 350 contains sets 351 of wheel stop data objects, each set having all the objects that convey a particular outcome value for a particular enhancement mode. There is a group 350 for each enhancement mode, all the wheel stop data in the group being representative of the symbols provided in the respective enhancement mode. Within a group, there is a set for each possible prize value within the prize distribution used with each respective enhancement mode. More groups and sets may be used for other game features. The presentation controller iterates through each of the spin results (Prize 1-Prize 4) in the display control script 349 and selects a respective wheel stop data object 352 to display that result. For example, the third bonus spin in the depicted script 349 has a spin result of a 50 credit prize. The presentation controller uses this value to select a wheel stop data object 352 to show a dual wheel spin and stop with a 50 credit award. The depicted wheel stop data object 352 chosen for this example conveys a 50 credit prize by stopping the credit wheel on 25 credits and the multiplier wheel on 2× multiplication. Note that a multiplier in a wheel stop data field determines the calculation of the prize for that wheel spin, but the multiplier in the display control script 349 indicates only the current enhancement mode (maximum multiplier available in the current mode).

The wheel stop data object selection preferably proceeds as follows. Using a spin result value of 50 credits in this example, the presentation controller identifies a set 351 of wheel stop data objects, all having a 65 credit outcome. The group 350 includes multiple sets. From the selected set 351, the presentation controller randomly selects a particular wheel stop data object 352, preferably by generating a random number to use as an index of the set 351 (a similar process to selection of scripts 349 from script sets 348 described above). Other random selection processes may be used, or, as described above, a suitable sequence may be provided which is not random but appears so to the player. In any event, the presentation controller displays the present spin result by selecting a wheel stop data object 352, as indicated at arrow 6.

The wheel stop data object contains a wheel stop position indicator for each wheel in the bonus display. (The preferred display has two wheels, one a credit amount and the other a multiplier. Other displays may use more wheels and therefore more wheel stop data). The presentation controller uses the wheel stop data to control final positions for wheels simulated on the display. While the term "wheel stop data object" is used to describe one embodiment because the secondary round includes spinning wheels, the data objects 352 may control any suitable type of display item positions including simulated or real wheels, reels, or other display items.

After each simulated spin and stop, the presentation controller awards any prize and then continues to display further spin results stored in script 349 using the same depicted process (arrows 5 and 6) until all are displayed. The final free bonus spin (in this example, spin 4 based on the listed Prize 4) constitutes the return event from the second display state to the first display state.

In this embodiment, game operation in the first display state proceeds very similarly to game operation in the second display state. Game results may be determined by random number generation, predetermined outcome records, or bingo games, for example. Results are displayed by choosing display scripts randomly, organized in sets and groups similarly to the bonus display scheme described with regard to FIG. 3C. Note that preferably each enhancement mode has a different group of display control scripts and a group of reel stop data objects for the base game, reflecting the different payout distributions provided at each enhancement mode. The reel stop data objects included therein preferably have 5 positions, one each for the 5 multi-symbol reels used in the base game. Of course, other numbers of reels may be used.

As previously described, some alternative games may provide for wagers in the second display state. In those cases, a second lookup table or outcome record pool may be used for the second display state, with some entries or records containing return event flags that trigger a return to the first display state. The outcomes (payouts) and their relative frequencies may vary between those outcome tables or record pools.

Figure 4:
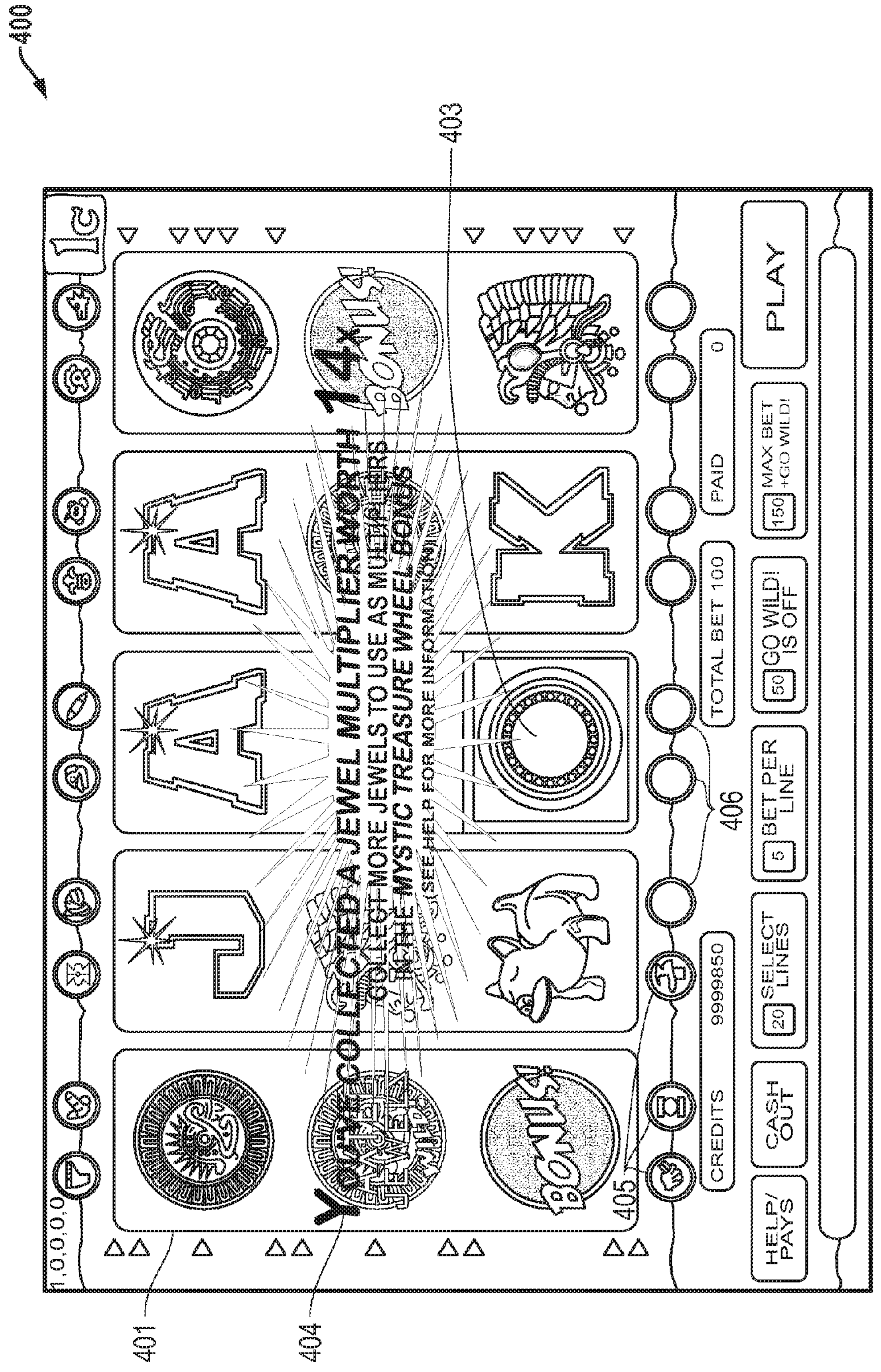
FIG. 4 is a representation of a graphic display that may be used to display a first game result and prize enhancer symbols according to one form of the present invention.

The example graphic representations shown in FIGS. 4 through 10 may be used to describe one preferred form of the invention. The graphic 400 shown in FIG. 4 includes a video representation of a five reel gaming machine display which produces a 3×5 matrix 401 of symbol locations through which a number of pay lines may be defined. The particular graphic 400 shown in FIG. 4 shows a prize enhancer activating outcome according to the invention. This outcome is symbolized by the jewel symbol 403 on the middle reel of the five reel simulation. The notice 404 notifies the player that they have collected a jewel multiplier. The jewel multiplier in this form of the invention represents a prize enhancer symbol. As they are collected over a number of plays in the first game, the jewel multipliers, or more generally prize enhancer symbols, are collected at locations around the periphery of the reel simulation matrix. For example locations 405 in FIG. 4 represent locations at which prize enhancer symbols are shown, whereas location 406 represents a location that does not yet contain a respective prize enhancer symbol.

Figure 5:
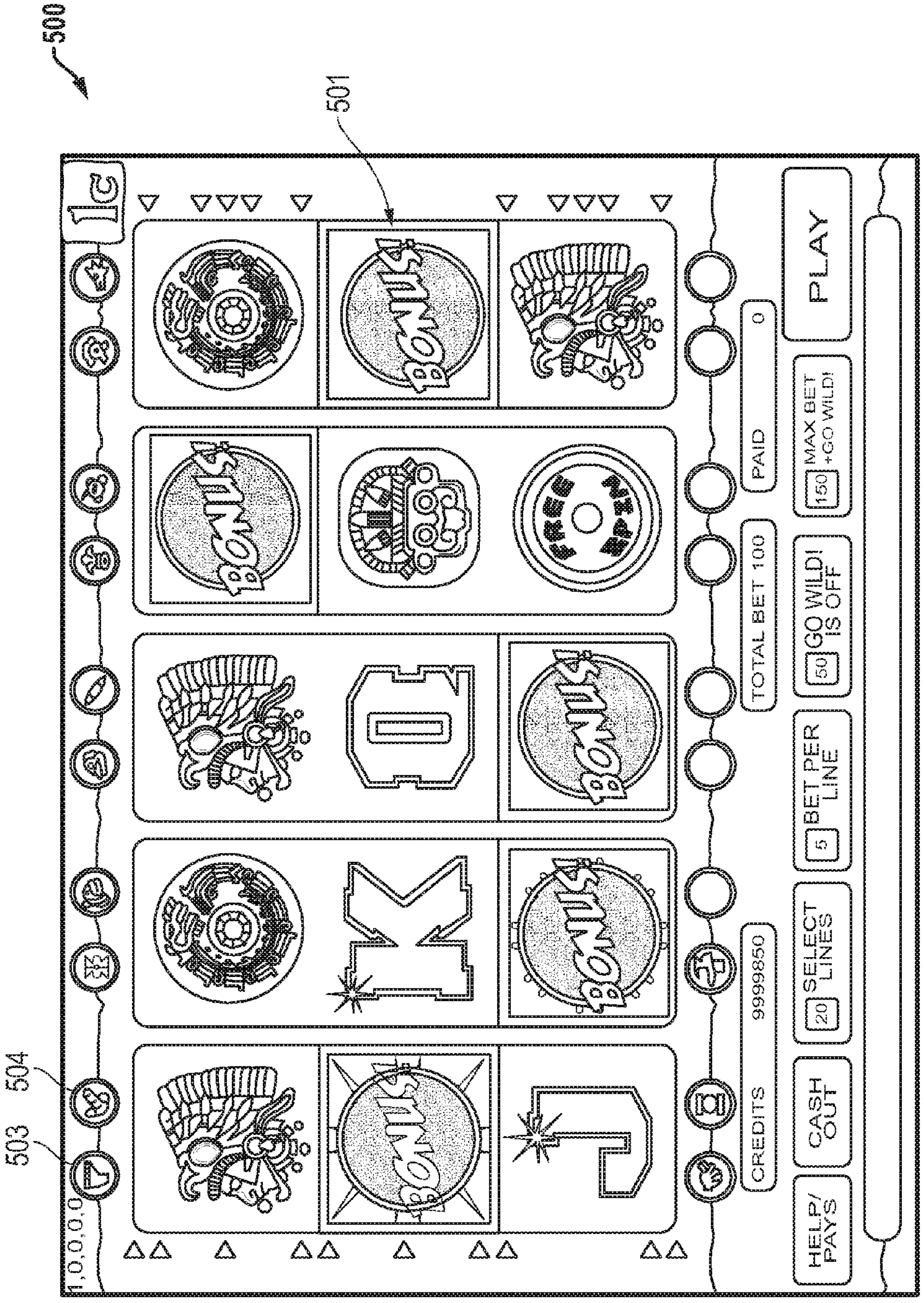
FIG. 5 is a representation of a graphic display of a trigger event in the first game.
Figure 6:
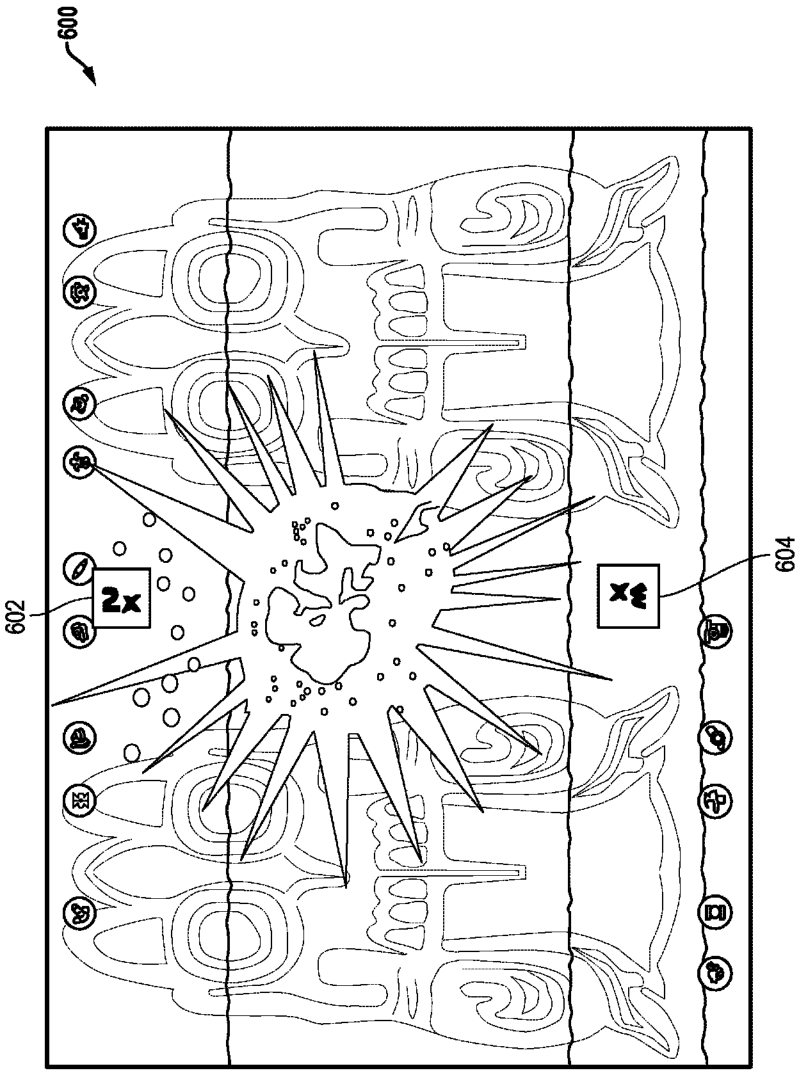
FIG. 6 is a representation of a graphic display showing an initial portion of a transition from a first game display to a wheel game display according to one embodiment.

The graphic representation 500 shown in FIG. 5 is similar to that shown in FIG. 4 including a 3×5 matrix 501 of symbol locations defined by five simulated reels. The particular result shown in FIG. 5 comprises a result that has been defined as a trigger event for triggering a change from the first game to a wheel type game according to the invention. In response to the detection of the trigger event comprising the outcome shown in FIG. 5, the present invention includes beginning a transition from the first game graphic to a wheel game graphic. A point near the start of the transition is shown in graphic representation 600 of FIG. 6. In the course of this transition, each prize enhancer symbol that has been collected moves from the peripheral location of the first game display into a position for the wheel type display. In this example, a first prize enhancer symbol that was originally displayed in the upper left most prize enhancer symbol position of FIG. 5 (position 503), has moved into position 602 that will ultimately become a wheel position. The next adjacent prize enhancer symbol (from position 504 in FIG. 5) is starting to fade in FIG. 6 and reappears in a position 604 to be included on a prize wheel.

Figure 7:
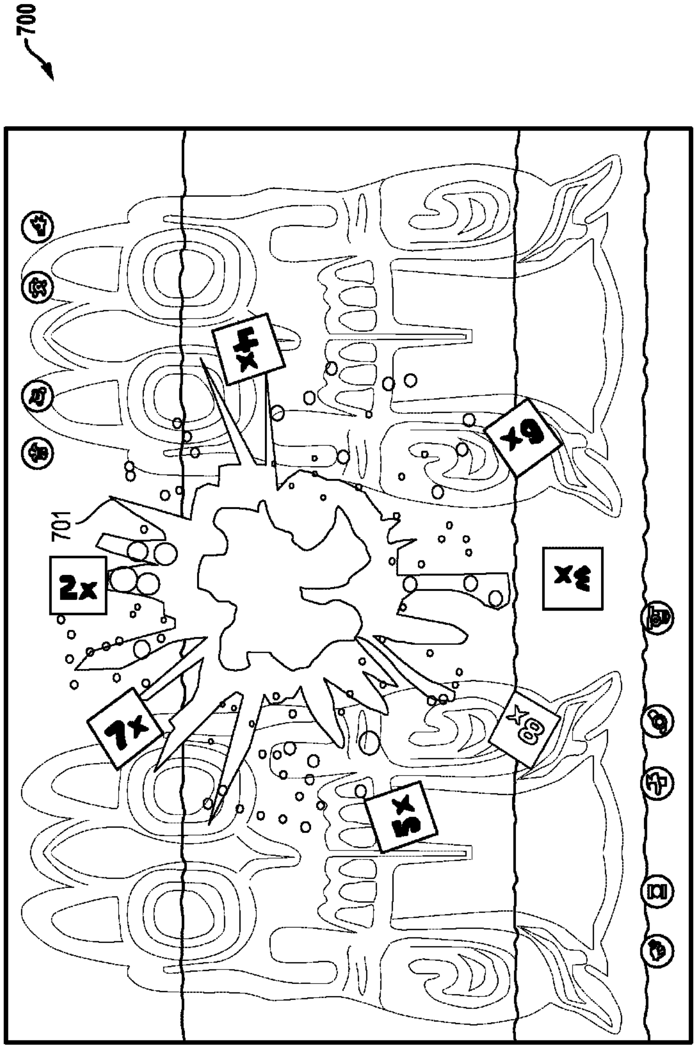
FIG. 7 is a representation of a graphic display showing a later portion of the transition as compared to FIG. 6.
Figure 8:
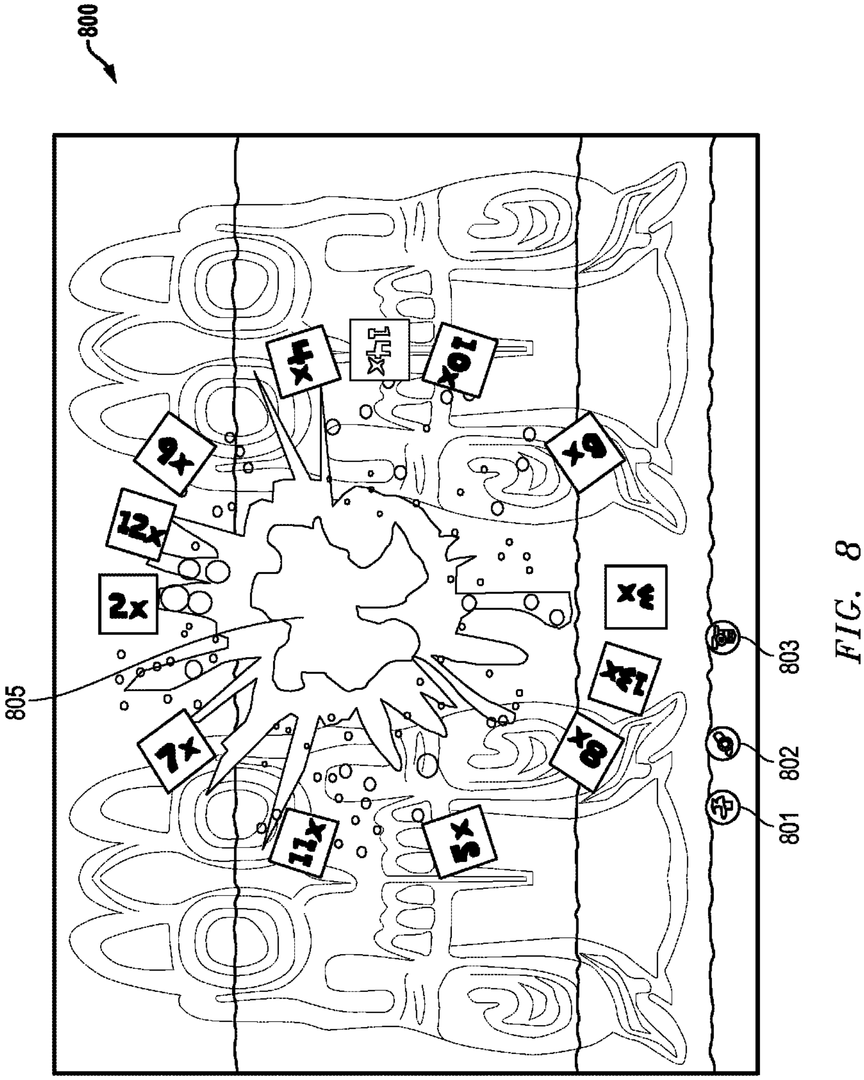
FIG. 8 is a representation of a graphic display showing a later portion of the transition as compared to FIG. 7.

FIG. 7 shows a graphic representation 700 which is further along in the transition to the wheel display according to the invention. At this point in the transition, several more of the prize enhancer symbols that were collected on the periphery of the graphic in the course of the reel-type game have transitioned to take a position ultimately in a wheel which will eventually be displayed. A starburst graphic 701 in the center of the collecting symbols is shown intensifying in graphic 700. FIG. 8 shows a graphic representation 800 even further along in the transition to the wheel display according to the invention. At this point in the transition, all of the prize enhancer symbols except three 801, 802, and 803 along the lower periphery of the display have transitioned to the wheel positions around the starburst 805. The starburst graphic in the center of the collecting symbols has intensified even further.

Figure 9:
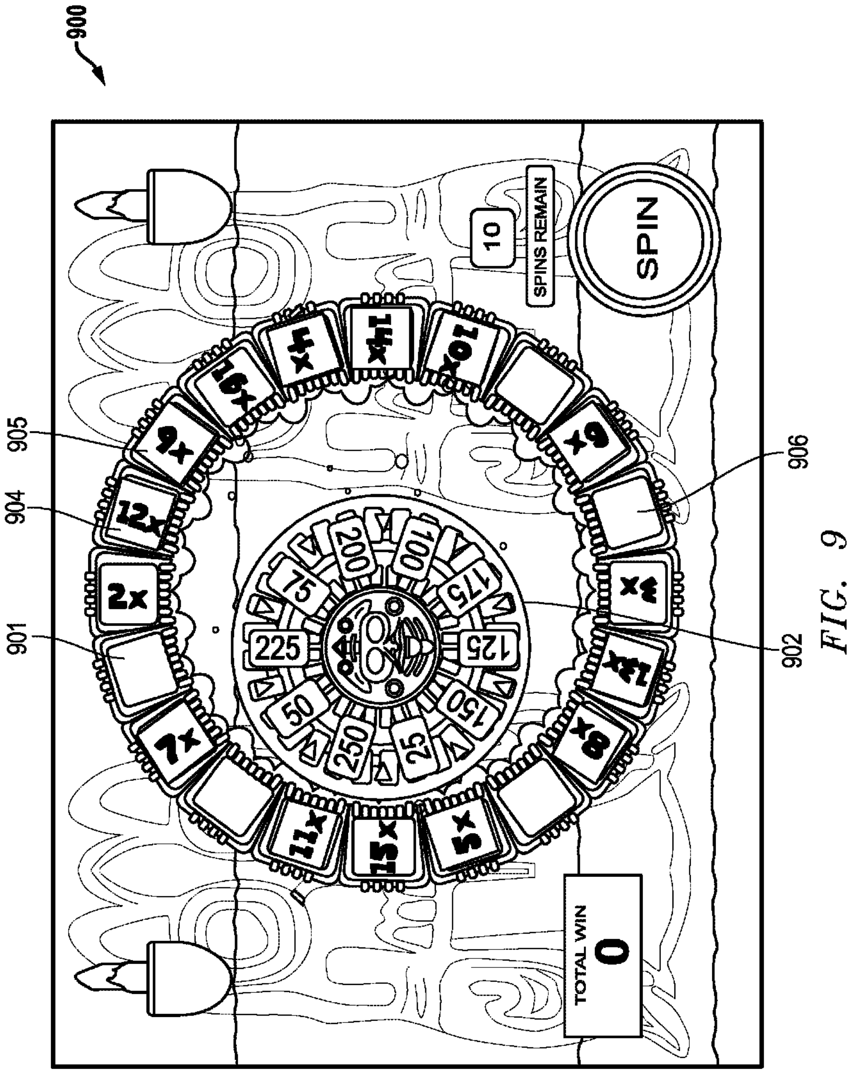
FIG. 9 is a representation of a graphic display showing a multiple wheel arrangement according to one form of the invention.

The graphic 800 shown in FIG. 8 continues to transition and transform until it ultimately reaches the graphic 900 shown in FIG. 9. In this graphic both the larger first wheel 901 and the smaller second wheel 902 are visible. The prize enhancer symbols that were collected during the conduct of the first game now take up symbol positions around the periphery of wheel 901, for example at positions 904 and 905. Wheel 902 includes numerical prize values spaced apart at different angular orientations about the center of rotation for the wheel. It will be noted that wheel 901 includes symbol positions (e.g. 906) that are not filled with a prize enhancer symbol. This may occur in forms of the invention where a transition to the wheel game may occur before a maximum number of prize enhancer symbols have been collected in the first game. In this respect, the wheel game is variable in that the wheel may not be the same from one wheel game to the next.

Figure 10:
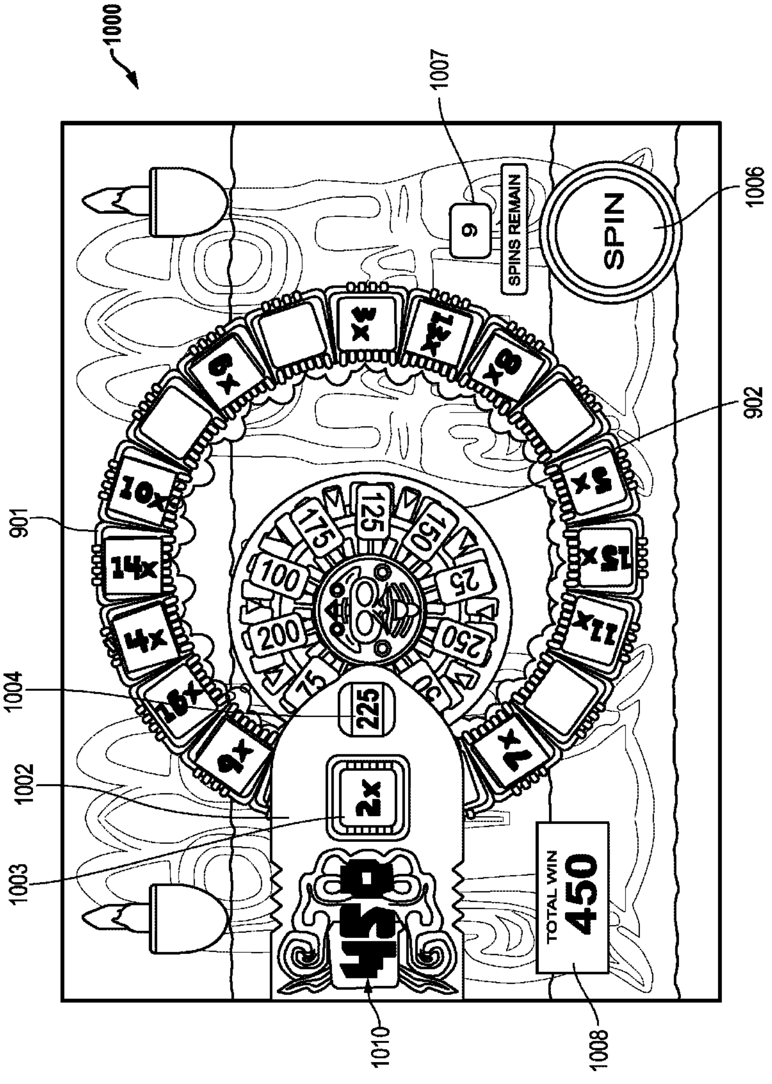
FIG. 10 is a representation of the graphic display similar to FIG. 9, but further including a prize alignment element showing the result of a spin of the wheels.

FIG. 10 shows a graphic representation 1000 that represents a final form of the transition to the wheel game in this particular embodiment of the invention. Both the first wheel 901 and second wheel 902 are visible along with an alignment element 1002 with windows 1003 and 1004 in which an aligned prize value and prize enhancer symbol may appear to indicate a win value in the wheel game. FIG. 10 also shows a touchscreen implemented spin button 1006 included in the graphic, and spins remaining information 1007. A total win window 1008 is included on the lower left-hand side of the graphic. The particular graphic 1000 shown in FIG. 10 is suitable for a wheel game in which a player is given a certain number of spins of the wheels and is awarded a prize indicated at the conclusion of a respective spin. The individual spin awards may be cumulative. In the particular state of graphic 1000 shown in FIG. 10, the player has taken a spin and the first wheel 901 has stopped with a 2× multiplier aligned in window 1003. The smaller second wheel 902 has stopped for the spin with the prize value 225 showing through window 1004. The 2× multiplier applied to this 225 value produces a total win for the particular spin of 450 credits which is shown in the total win window 1008 and also in a per spin win indicator shown at 1010.

The wheel arrangement shown in FIG. 10 facilitates several different types of operation. In one form of the invention, the larger wheel 901 and smaller wheel 902 may spin together as if they were intermeshed gears, and do not rotate independently. In other forms of the invention the two wheels may rotate entirely independently. In any event, it may be desirable in the conduct of a given game to adjust the relative angular orientation between the larger wheel 901 and smaller wheel 902. This may be desirable to more quickly allow the two wheels to come to rest showing the desired prize value in window 1004 and multiplier value in window 1003. One form of the invention utilizes an obscuring graphic in the form of a starburst that appears to obscure the smaller wheel 902 for a brief period of time during a given spin, and preferably at the start of a spin. The obscuring effects of the starburst allows the orientation of the smaller wheel 902 to be changed abruptly to produce a desired alignment with the larger wheel 901.

The example displays shown in FIGS. 4-10 are shown only as convenient examples for describing the principles of the invention. Many variations on these basic examples may be employed within the scope of the present invention. In particular, the invention is not limited to any type of style of wheels for the wheel display. Other graphic displays may include more or fewer wheel simulations or one or more award alignment elements.

As used herein, the terms "comprising," "including," "carrying," "having," "containing," "involving," and the like are to be understood to be open-ended, that is, to mean including but not limited to.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A gaming method for conducting a wagering game displayed to a player on an electronic display, the method including:

(a) conducting a primary game for the player including one or more prize enhancer activating outcomes, each including a respective prize enhancement symbol displayed on the display, each prize enhancement symbol being associable with a bonus value enhancement in a bonus game, operable in the bonus game to increase a credit value of a secondary award;

(b) conducting the bonus game for the player triggered by a trigger event in the primary game, the bonus game including one or more secondary outcomes associated with one or more secondary awards; and (c) providing an award to the player wherein the award includes at least one of the secondary awards enhanced by the bonus value enhancement;

(d) in response to the trigger event, displaying a bonus game display state in which the prize enhancement symbol is employed in displaying a bonus outcome;

(e) wherein the bonus game comprises a wheel game including at least one displayed rotating wheel, and in which the prize enhancement symbol is displayed on the wheel;

(f) in response to the trigger event, displaying a first wheel having a first diameter, a first rotational axis, and a number of symbol locations spaced apart at different angular orientations about the first rotational axis, the first wheel being displayed with the first rotational axis extending substantially perpendicular to a display plane;

(g) also in response to the trigger event, displaying a second wheel having a second diameter, a second rotational axis, and a number of symbol locations spaced apart at different angular orientations about the second rotational axis, the second diameter being less than the first diameter and the second wheel being displayed within the area defined by the first wheel with the second rotational axis extending parallel to and offset from the first rotational axis;

(h) also in response to the trigger event, moving each respective displayed prize enhancement symbol to a different one of the symbol locations of the first wheel or the second wheel;

(i) in response to an activation by a player, causing the first wheel to rotate about the first rotational axis and causing the second wheel to rotate about the second rotational axis for a period of time and ultimately each stop at a particular angular orientation, wherein said orientation provides that one respective prize enhancement symbol is aligned in an award relationship with an oriented prize symbol on the other one of the first wheel or second wheel; and (j) awarding a prize to the player, the prize corresponding to a combined effect of the prize symbol and the respective prize enhancement symbol aligned in the award relationship.

2. A gaming apparatus including:

(a) a display device arrangement;

(b) a player input device arrangement; and (c) a gaming controller arrangement including one or more gaming controllers programmed for (i) conducting a primary game for a player including one or more prize enhancer activating outcomes, each including a respective prize enhancement symbol displayed on the display, each prize enhancement symbol being associable with a bonus value enhancement in a bonus game, operable in the bonus game to increase a credit value of a secondary award; (ii) conducting the bonus game for the player triggered by a trigger event in the primary game, the bonus game including one or more secondary outcomes associated with one or more secondary awards; (iii) providing an award to the player wherein the award includes at least one of the secondary awards enhanced by the bonus value enhancement;

(d) in response to the trigger event, displaying a bonus game display state in which the prize enhancement symbol is employed in displaying a bonus outcome;

(e) wherein the bonus game comprises a wheel game including at least one displayed rotating wheel, and in which the prize enhancement symbol is displayed on the wheel;

(f) in response to the trigger event, displaying a first wheel having a first diameter, a first rotational axis, and a number of symbol locations spaced apart at different angular orientations about the first rotational axis, the first wheel being displayed with the first rotational axis extending substantially perpendicular to a display plane;

(g) also in response to the trigger event, displaying a second wheel having a second diameter, a second rotational axis, and a number of symbol locations spaced apart at different angular orientations about the second rotational axis, the second diameter being less than the first diameter and the second wheel being displayed within the area defined by the first wheel with the second rotational axis extending parallel to and offset from the first rotational axis;

(h) also in response to the trigger event, moving each respective displayed prize enhancement symbol to a different one of the symbol locations of the first wheel or the second wheel;

(i) in response to an activation by a player, causing the first wheel to rotate about the first rotational axis and causing the second wheel to rotate about the second rotational axis for a period of time and ultimately each stop at a particular angular orientation, wherein said orientation provides that one respective prize enhancement symbol is aligned in an award relationship with an oriented prize symbol on the other one of the first wheel or second wheel; and (j) awarding a prize to the player, the prize corresponding to a combined effect of the prize symbol and the respective prize enhancement symbol aligned in the award relationship.

* * * * *